United States Patent [19]
Mayer

[11] 3,846,355
[45] Nov. 5, 1974

[54] POLYURETHANE COMPOSITIONS EXTENDED WITH LOW AROMATIC HYDROCARBON OILS

[76] Inventor: Simon Ernest Mayer, 7 Russell Rd., Lexington, Mass. 02173

[22] Filed: Oct. 16, 1972

[21] Appl. No.: 298,149

Related U.S. Application Data

[63] Continuation-in-part of Ser. No. 113,033, Feb. 5, 1971, abandoned.

[52] U.S. Cl............... 260/18 TN, 260/31.4 R, 260/33.6 UB, 260/37 N, 260/75 TN, 260/77.5 AP
[51] Int. Cl............................................. C08g 22/04
[58] Field of Search... 260/33.6 UB, 18 TN, 31.4 R, 260/37 N, 775 AP, 75 TN

[56] References Cited
UNITED STATES PATENTS

| | | | |
|---|---|---|---|
| 3,227,666 | 1/1966 | Showalter | 260/2.5 |
| 3,314,903 | 4/1967 | Belak et al. | 260/33.6 |

FOREIGN PATENTS OR APPLICATIONS

| | | | |
|---|---|---|---|
| 711,299 | 6/1965 | Canada | 260/2.5 |

*Primary Examiner*—Donald E. Czaja
*Assistant Examiner*—Eugene C. Rzucidlo
*Attorney, Agent, or Firm*—David E. Brook

[57] ABSTRACT

Solid polyurethane resins containing a non-compatible hydrocarbon oil homogeneously dispersed therein are prepared by thoroughly admixing the polyurethane reactants, a low aromatic hydrocarbon oil, and particular emulsifying and thixotropic colloidal agents.

8 Claims, No Drawings

POLYURETHANE COMPOSITIONS EXTENDED WITH LOW AROMATIC HYDROCARBON OILS

This application is a continuation-in-part of Ser. No. 113,033, filed Feb. 5, 1971, now abandoned.

The present invention relates to solid polyurethane resins having a hydrocarbon oil homogeneously dispersed therein. More particularly, this invention relates to a method of incorporating a normally non-compatible low aromatic hydrocarbon oil into polyurethane resins and to the polyurethane resin compositions obtained thereby.

Many advances have been made in recent years in the use of polyurethane resins in foams, coating, adhesives, molding compositions, elastomers and a variety of other applications. However, the cost of the raw materials, particularly the polyisocyanate reactant, still represents a serious drawback to the use of polyurethane resins in some applications. An obvious expedient for lowering the cost of polyurethane resins would be to extend the polyurethane resins with a low cost filler material such as is used in other plastics and elastomers, and it is well-known to use a variety of finely divided inorganic material such as silica or kaolin clay as fillers to extend polyurethanes.

In accordance with the present invention, it has now been discovered that inexpensive low aromatic hydrocarbon oils which are normally non-compatible with the polyurethane reactants can be used to extend the polyurethane resin product. More specifically, it has been found that substantial amounts of a hydrocarbon oil having a low aromatic content may be incorporated into a two part polyurethane system, of which one part is a polyisocyanate and the other part is a polyol, by employing a combination of an emulsifying agent and a thixotropic colloidal agent to form a stable emulsion of the polyurethane system and the hydrocarbon oil during reaction to produce a solid polyurethane resin product having the hydrocarbon oil homogeneously dispersed therein. Since the non-compatible low aromatic hydrocarbon oil would normally completely separate from the reaction mixture during the reaction or from the solid polyurethane resin product, the results achieved by the present invention have not been possible heretofore.

The solid polyurethane resin products to be extended with the low aromatic hydrocarbon oil in accordance with this invention are of the well known and conventional type prepared from polyisocyanatepolyol systems. Such polyurethane resins, depending on the polyols used and the degree of cross-linking, give rise to products having a wide variety of physical properties and have application in coatings, adhesives, molded products, etc.

The polyisocyanates used to prepare the polyurethane resins of the present invention are usually di-or higher functional polyisocyanates. As a rule, the aromatic substituted polyisocyanates are preferred over the aliphatic members for reason of cost. Suitable polyisocyanates include, for example, mixed polymethylene polyphenyl isocyanates of functionality ranging from 2 to 3, 2,4-tolylene diisocyanate, 2,6-tolylene diisocyanate and mixtures of the 2,4- and 2,6-isomers; 3,3'-bitolylene-4,4'diisocyanate; diphenyl methane-4,4'diisocyanate; hexamethylene diisocyanate; meta-phenylene diisocyanate; 3,3-dimethyl-diphenylmethane-1,4'diisocyanate, triphenylmethane triisocyanate, ethylene diisocyanate, tri-tetra-and pentamethylene diisocyanate, 1,2-propylene diisocyanate, 1,2-butylene diisocyanate, and the like as described in U.S. Pat. No. 3,142,651. Mixtures of various polyisocyanates may also be employed.

Polyols useful in preparing the polyurethanes of the present invention include polyols selected on the basis of what is often called the hydrophilic-lipophilic balance. Those materials having a long carbon chain, i.e., at least about 10 carbon atoms, which make them more compatible with the low aromatic hydrocarbon oils are particularly suitable. The most common examples of this class are various castor oil derived polyols, ranging from hydroxyoleic acid triglyceride oils to more complicated multi-functional hydroxy-terminated derivatives as described in U.S. Pat. No. 2,787,601. Next in compatability are polyols derived from polyesters, particularly those built from straight chain building blocks, such as adipic acid and ethylene or propylene oxide. Also suitable are polyols derived from fully substituted amines such as triisopropanolamine, triethanolamine, and N,N,N',N'tetrakis(2-hydroxypropyl)ethylene diamine. Polyols derived from polyethers, particularly those having a high molecular weight of from about 2,000 to 5,000, such as the glycols, can also be used. Some useful polyols, for example, include DB oil (triglyceride of hydroxyoleic acid), Polycin oils (Baker Castor Oil Co.) of functionality 2.0 – 4.5 and hydroxyl number 80 – 350; polyols derived from polyesters containing a large proportion of adipic acid (or other divalent linear acids) and ethylene oxide or propylene oxide, these polyols generally having a molecular weight ranging from about 500 to 5,000, and preferably from about 1,000 to 3,000, as described in U.S. Pat. Nos. 3,227,666 and 3,142,651.

The hydrocarbon oils which are useful as extenders for polyurethane resins in accordance with the present invention are those oils not normally soluble or compatible with the polyurethane components, even such components as phenylisocyanate castor oil derivative adducts which generally have a high tolerance for hydrocarbons. The hydrocarbon oils used in this invention are primarily paraffinic or olefinic in nature and are low in aromatic content. Such hydrocarbon oils are preferably high boiling petroleum fractions such as mineral oils, fuel oils, kerosenes and conventional lubricating oils having a boiling point at atmospheric pressure above about 150°C. Specific examples of suitable hydrocarbon oils include mineral oils, fuel oils Nos. 2, 3, 4 and 5, diesel oil, naphthenic process oils, etc. In general oils of Kauri-Butanol values of about 25 to 40 are preferred, since at lower values emulsification becomes difficult, i.e., excessive and uneconomical amounts of emulsifiers have to be used. At high values the oils act as plasticizers of the urethane phase and very poor properties are obtained. Hydrocarbon oils having an aniline point between 130° and 190°F. are also preferred.

It has been found that in practicing the present invention, it is possible to form a stable emulsion containing at least 25 parts by weight and up to about 100 parts or more of hydrocarbon oil per 100 parts of polyurethane reactants. For most purposes, from about 40 to 80 parts by weight of hydrocarbon oil per 100 parts of polyurethane reactants will be used. Thus, the solid polyurethane product will contain at least 20 percent by weight of the low aromatic hydrocarbon oil based on the total ingredients including the oil. In preparing separate premixes of the organic polyisocyanate and the polyol reactants, at least 10 parts by weight of the low aromatic hydrocarbon oil per 100 parts of the polyisocyanate and the polyol, respectively, will be utilized.

As previously set forth, the hydrocarbon oil is incorporated into the polyurethane resins by forming a stable emulsion of the polyurethane reactants and the low aromatic hydrocarbon oil during the polyurethane resin synthesis. It has been found that by adding to the reaction mixture a combination of an emulsifying agent comprising, for example, an ethylene oxide adduct of a fatty acid or fatty acid derivative and a thixotropic collodal agent such as Ircogel 900 sold by The Lubrizol Corporation of Cleveland, Ohio, a stable emulsion of the polyurethane reactants and the hydrocarbon oil will result. This stable emulsion is maintained during the polyurethane resin synthesis step, and the low aromatic hydrocarbon oil is intimately and homogeneously dispersed throughout the resulting solid polyurethane resin product.

Emulsifying agents useful in practicing the present invention may generally be described as an alkylene oxide adduct of a long chain fatty acid or fatty acid derivative, said fatty acid or fatty acid derivative having from 12 to 20 carbon atoms. Such emulsifying agents should have both a non-polar and a polar moiety so that they will be soluble in both the polyurethane and the hydrocarbon oil. However, the polar groups and the oil soluble groups should be balanced in a manner such that the emulsifying agent is more soluble in the polyurethane reactants than in the hydrocarbon oil. Emulsifying agents suitable for use in the present invention include, for example, diethylene-glycol-oleylether, diethylene-glycol-cetylether, diethylene-glycol-stearylether, sorbitan mono-oleate, sorbitan monostearate, certain fatty acid amines having a preponderance of fatty acid in their structure and being oil soluble, and mixtures thereof.

As indicated above, stable emulsions of the polyurethane reactants or ingredients and the low aromatic hydrocarbon oil are obtained only when the emulsifying agents described above are used in combination with certain thixotropic colloidal thixotropic agents. Such colloidal agents are characterized by their ability to form micelles of stable, uniform inorganic nuclei having a diameter of less than 0.1 micron size, preferably in the range of 0.005 to 0.05 micron size, in non-polar organic systems such as the hydrocarbon oils previously set forth. Examples of suitable thixotropic colloidal agents are those metallo-organic complexes which can generally be described as basic calcium sulfonate or basic magnesium sulfonate complexes with organic materials. A particularly effective thixotropic agent is Ircogel 900 a commercially available, grease-like thixotropic agent sold by The Lubrizol Corporation. Ircogel 900 is prepared by homogenizing (e.g., vigorously agitating) a mineral oil solution of a carbonated, calcium-overbased oil-soluble sulfonic acid in the presence of active hydrogen compounds. Some typical properties of Ircogel 900, a 100 percent calcium organic complex, are as follows:

| | |
|---|---|
| Color | Light Brown |
| Specific Gravity at 60°F | 1.10 |
| Flash Point | 400°F |
| Calcium % wt. | 12.0 |

The use of other known thixotropic agents such as finely divided silica did not prove effective in the method of the present invention.

The amounts of emulsifying and thixotropic colloidal agent to be used will vary depending on a variety of factors such as the particular polyurethane precursors used, the amount of hydrocarbon oil to be added, etc. In general, however, the emulsifying agent need only be employed in an amount sufficient to emulsify the hydrocarbon oil, while the thixotropic agent need only be employed in an amount sufficient to nucleate the hydrocarbon oil. More specifically, the weight ratio of emulsifying agent to colloidal agent may range from about 2 to 1 to about 1 to 2. The amount of emulsifying agent used may vary from about 1 part by weight to about 10 parts per 100 parts of the total reaction mixture (i.e., polyurethane reactants and hydrocarbon oil). The amount of colloidal agent used may vary from about 0.5 part by weight to about 5 parts per 100 parts of the total reaction mixture, as defined above.

In preparing the stable emulsions of polyurethane reactants and hydrocarbon oil, the emulsifying agent (and the hydrocarbon oil) can be premixed into either the polyisocyanate reactant, the polyol reactant, or divided among the two reactants. The collidal agent is, however, preferably premixed with the polyol reactant.

Any of the customary urethane catalysts, either of the amine type or the metallic type, i.e., materials such as triethylenediamine, lead octoate, tin octoate and dibutyl tin dilaureate and other compounds of the same class, are suitable; the choice depending on the reactivity of the components entering into the reaction and the mass to be reacted, i.e., the exotherm to be expected. Only catalytic amounts need be employed. The reaction system will usually be solvent free.

For most applications it will be advantageous to have the ingredients premixed in two portions: one portion (A) containing the polyisocyanate, part of the oil and an emulsifying agent; and the other portion (B) containing the polyol, the rest of the oil, the catalyst more emulsifying agent, and the thixotrope. It is usually convenient to have the two portions or premixes at room temperature. The reaction can be made to take place either on a batch basis, i.e., by mixing predetermined amounts of the ingredients together in a batch, or on a continuous basis using proportioning pumps and a mixing head. In either case, thorough mixing of the two portions is necessary and the amount of catalyst utilized is such as to allow such mixing before the mass gets gradually more viscous and finally sets up into a solid with the development of a considerable amount of heat (exotherm). Reaction temperatures of 100°C. are often reached in large masses as it is desired to obtain rapid gelling. It is, however, necessary to limit the temperature reached to about 150°C., otherwise deterioration of the properties of the final product will result.

In general, the weight ratio of polyol to polyisocyanate will range from about 0.85 to 1.5, preferably from about 1 to 1.2. Portions A and B are mixed together in amounts by volume ranging from about 1 to 1 to 1 to 2, respectively.

The solid polyurethane product, when prepared in this manner, will contain the low aromatic hydrocarbon oil as a dispersed phase within a continuous urethane phase so that it will not bleed out from cut surfaces or when the temperature is raised to temperatures as high as 100°C.

The invention will be more fully understood by reference to the following illustrative embodiments:

EXAMPLE I

Run 1 — About 80 parts by weight of No. 2 Fuel Oil were admixed with a two component urethane mix as follows:

Part A:
  80 parts by weight of polymethylene-polyphenylisocyanate having a functionality of 2.7 and 20 parts by weight of No. 2 Fuel Oil Part B:
  30 parts by weight of triisopropanolamine 10 parts by weight of a castor oil polyol having a hydroxyl value of 327
  0.4 parts by weight of triethylene diamine
  60 parts by weight of No. 2 Fuel Oil Part A and part B were then mixed by vigorous stirring. As the reaction proceeded a solid urethane was formed, complete separation of the fuel oil from the solid reaction product occurred.

Run 2 — Run 1 was repeated except that about 20 parts by weight of diethylene oxide oleylether, an emulsifying agent, was added. 10 parts were added to Part A and 10 parts to Part B. Separation of the fuel oil still occurred.

Run 3 — Run 1 was repeated except that about 10 parts by weight of the diethylene glycol oleyl ether was added. 5 parts to Part A and 5 parts to Part B and about 4 parts by weight of Ircogel 900 (basic calcium sulfonate) were added to Part B. Complete emulsification of the fuel oil occurred, and the resulting emulsion was stable during the course of the synthesis reaction, so that a solid reaction product was obtained having the oil uniformity dispersed therein.

Run 4 — Part A: Monsanto)
  40 parts by weight of polymethylenepolyphenylisocyanate having a functionality of 3. 4 parts by weight of diethylene glycol oleylether 10 parts by weight of a mixture of two-thirds No. 5 Fuel Oil and one-third of a chlorinated polyphenyl (MONTAR No. 5 - monsato) having a softening point of 202°–246°C., 53–4 percent chlorine, 1.27 percent calcium oxide, and 0.07 iron.

Part B.
  27 parts by weight of DB Castor Oil (hydroxyl number 163)
  9 parts by weight of glycerol
  0.5 parts by weight of tin octoate
  4 parts by weight of Ircogel 900
  4 parts by weight of diethyleneglycol oleylether
  10 parts by weight of Phosguard C22R (chlorinated organo phosphorous polymer — Monsanto)

To this Part B was added:
  60 parts by weight of the two-thirds Fuel Oil No. 5 — one-third MONTAR No. 5 mixture.

When the two parts were mixed under vigorous stirring a solid polyurethane reaction product was obtained with the oil completely dispersed therein. The product is self-extinguishing; the urethane phase having been rendered self-extinguishing by the organo phosphorous compound and the oil phase by the addition of the chlorinated polyphenyl.

EXAMPLE II

A master formulation, composed of two portions, was prepared from the following ingredients:

Part A:
  60 parts by weight of polymethylene-polyphenylisocyanate having a functionality of 2.7
  8.5 parts by weight of diethylene glycol oleylether
  32 parts by weight of No. 2 Fuel Oil having a Kauri-butanol value of 40

Part B:
  10 parts by weight of a fatty acid derived polyol (mol. wt. of 420, 2.3 functionality, and a hydroxyl value of 288)
  25 parts by weight of N,N,N';N'-tetrakis (2-hydroxyproplyl) ethylene diamine 42 parts by weight of No. 2 Fuel Oil have a Kauri-Butanol value of 40
  1.1 parts by weight triethylene diamine
  4 parts by weight of diethylene glycol oleylether
  4 parts by weight of Ircogel 900

Parts A and B were mixed by vigorous stirring as in Example I to obtain a solid polyurethane resin product.

A series of comparative runs, based on the above master formulation, were carried out utilizing all of the ingredients as well as where the emulsifying agent (diethylene glycol oleyl ether) or the thixotropic colloidal agent (Ircogel 900) were omitted. The presence of hydrocarbon oil separation in the solid polyurethane resin product was determined under ambient pressure. The results are set forth in the following table:

| Run No. | Master Formulation | Oil Separation Under Ambient Pressure |
| --- | --- | --- |
| (1) | As given above | None* |
| (2) | Emulsifying agent omitted from Parts A and B | Yes |
| (3) | Ircogel 900 Omitted | Yes |
| (4) | Irogel 900 omitted but increased emulsiflying agent 100% in Parts A and B | Yes |
| (5) | Emulsifying agent omitted in Parts A and B but increase. Ircogel 900 100% in Part B | Yes |

*No oil separation observed even when solid polyurethane resin was subjected to compression.

The foregoing data show the necessity of employing the combination of the emulsifying agent and the thixotropic colloidal agent to ensure stable dispersions of substantial amounts of a low aromatic hydrocarbon oil in solid polyurethane resins.

EXAMPLE III

The formulation was as follows:

Part A:
  60 parts by weight of polymethylene-polyphenylisocyanate having a functionality of 2.3
  7 parts by weight of isostearyl diethylene glycol ether
  30 parts by weight of an odorless, branched chain paraffinic oil having a Kauri-butanol value of 30

Part B:
  40 parts by weight of polypropylene triol having a mol. wt. of 2400

47.5 parts by weight of polypropylene diol having a mol. wt. of 2000
30 parts by weight of N,N-bis(2-propyl aniline)
2 parts by weight of triethylene amine
0.5 par by weight of dibutyl tin dilaurate
5 parts by weight of Ircogel 900
5 parts by weight of diethylene glycol oleyl ether
55 parts by weight of an odorless, branched chain paraffinic oil having a Kauri-butanol value of 30

Parts A and B were mixed by vigorous stirring as in Example I to obtain a solid polyurethane resin product having the low aromatic hydrocarbon oil dispersed therein. No hydrocarbon oil separation was observed, and the solid polyurethane resin product had a Shore A Hardness value of 70 and a split tear strength of more than 200 lbs./inch In addition to providing a less expensive polyurethane resin product, the use of the low aromatic hydrocarbon oil in accordance with the present invention lowers the viscosity of the reaction mixture thereby facilitating application in relatively thin films by spraying using conventional spray equipment, or casting in molds having very fine detail where a high viscosity mix would not be expected to reproduce fine detail. The presence of the hydrocarbon oil imparts better moisture resistance to the polyurethane resin product. Furthermore, the existence of stable emulsions in the premixes of the present invention are advantageous, since they obviate the necessity for continuous agitation in the storage containers.

While certain embodiments have been described above for the purpose of illustrating this invention, it will be obvious that various changes and modifications may be made without departing from the broader aspects of the invention.

What is claimed is:

1. In a polyurethane resin composition extended with at least 20 percent by weight of a low aromatic hydrocarbon oil having a Kauri-Butanol value of between about 25 and about 40, said polyurethane resin being a reaction product of an organic polyisocyanate and a polyol having a carbon chain of at least 10 carbon atoms:

the inprovement comprising including in said composition at least about 1 percent by weight of an emulsifying agent which is an alkylene oxide adduct derived from a long chain fatty acid having from 12 to 20 carbon atoms, and at least about 0.5 percent by weight of a colloidal thixotropic agent which is a metallo-organic complex and which produces micelles of stable, uniform inorganic nuclei having a diameter of less than 0.1 micron in said low aromatic hydrocarbon oil.

2. An improvement of claim 1 wherein said low aromatic hydrocarbon oil has an aniline point of between 130°F. and 190°F.

3. An improvement of claim 2 wherein said emulsifying agent is a diethylene glycol fatty acid ether.

4. An improvement of claim 3 wherein said diethylene glycol fatty acid ether is diethylene glycol oleyl ether.

5. An improvement of claim 4 wherein said colloidal thixotropic agent is formed by homogenizing a mineral oil solution of a carbonated, calcium-overbased, oil-soluble sulfonic acid in the presence of active hydrogen compounds.

6. An improvement of claim 5 wherein said emulsifying agent is present in an amount of from about 2 to about 0.5 times the amount of colloidal agent present.

7. An improvement of claim 6 wherein the weight ratio of said polyol to said polyisocyanate ranges from about 0.85 to about 1.5.

8. An improvement of claim 7 wherein said polyol has a molecular weight within the range of from about 500 to about 5,000.

* * * * *